April 23, 1957 H. BRIER 2,789,427
APPARATUS FOR GENERATING PREDETERMINED
STRAINS IN STRAIN GAUGES
Filed Feb. 2, 1954 2 Sheets-Sheet 2
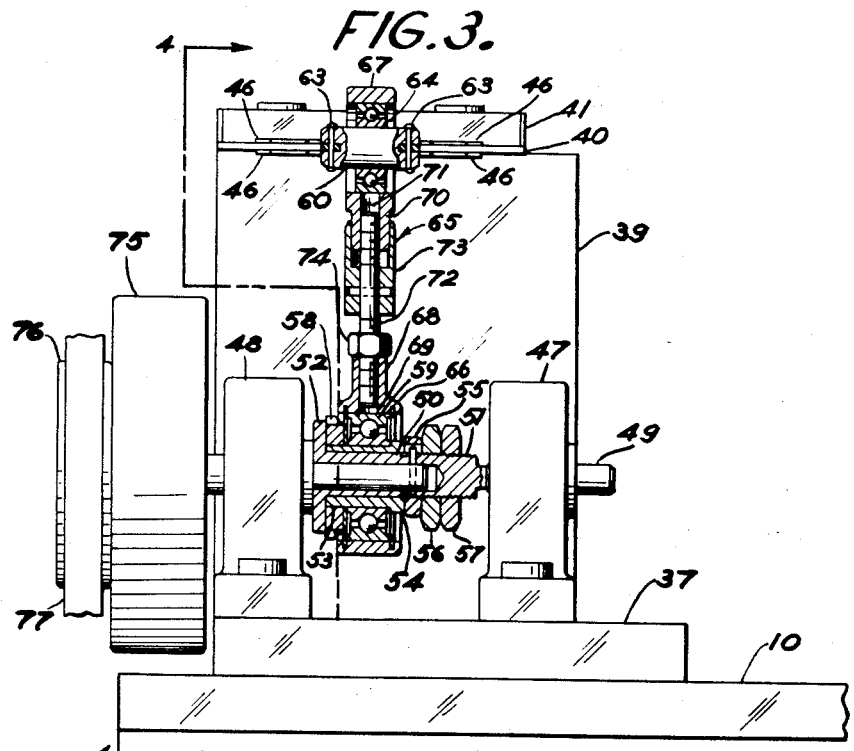
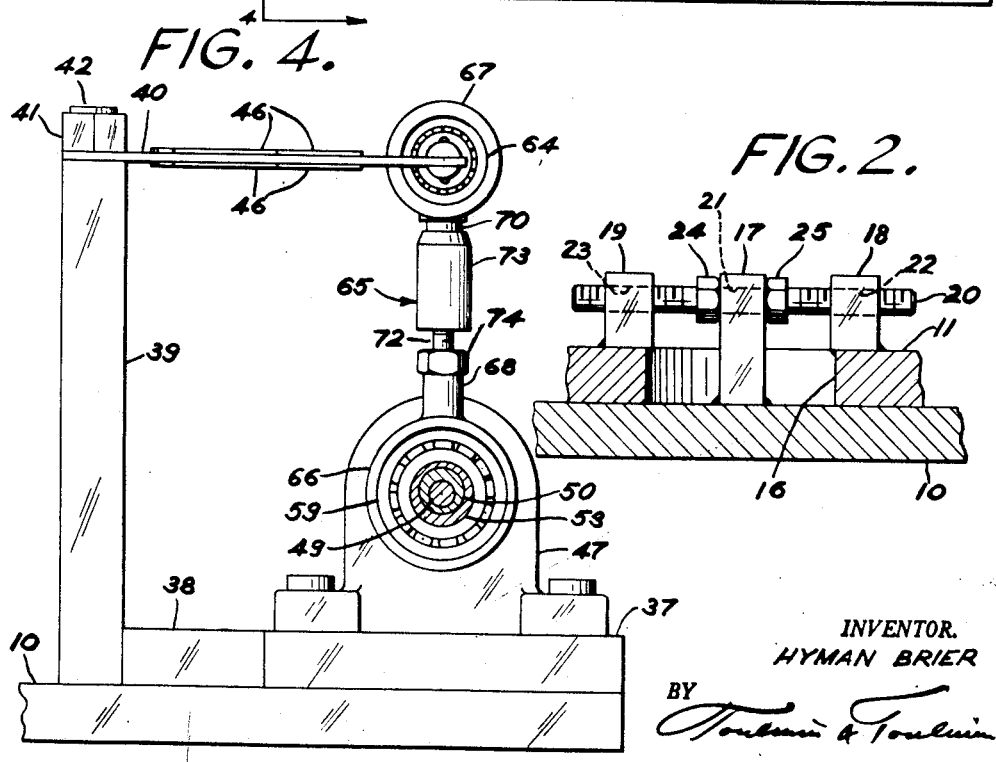
INVENTOR.
HYMAN BRIER
BY
ATTORNEYS United States Patent Office 2,789,427
Patented Apr. 23, 1957

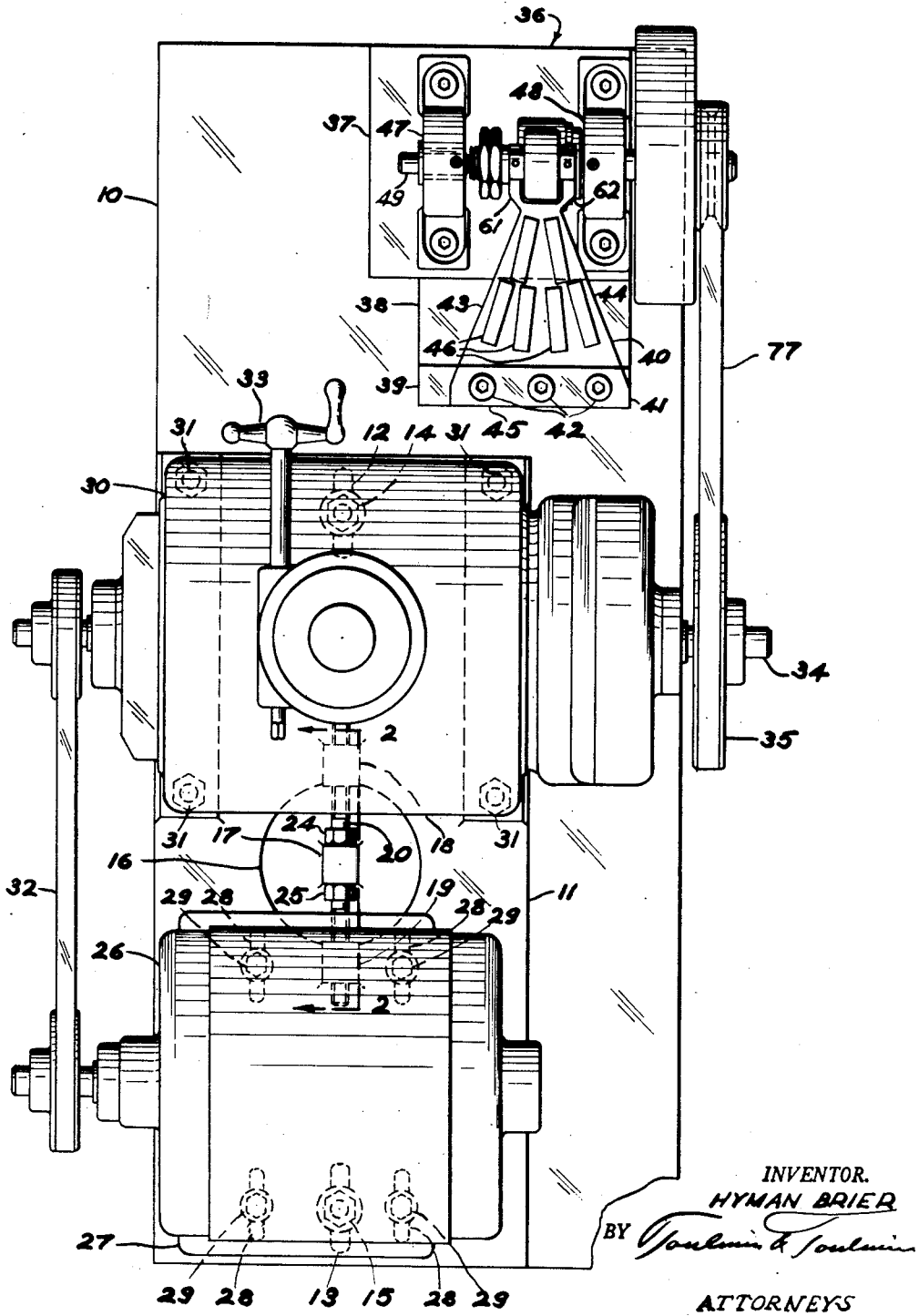

2,789,427

APPARATUS FOR GENERATING PREDETERMINED STRAINS IN STRAIN GAUGES

Hyman Brier, Dayton, Ohio, assignor to The Commonwealth Engineering Company of Ohio, Dayton, Ohio, a corporation of Ohio Application February 2, 1954, Serial No. 407,643

3 Claims. (Cl. 73—1)

The present invention relates to a calibrator apparatus, more particularly to an improved apparatus for generating strains of desired frequencies and amplitudes in resistance-type strain gauges.

Various methods have been developed to measure stresses and strains produced in structures and machinery under test. The use of resistance strain gauges has proved particularly useful. In employing a resistance strain gauge, the gauge is suitably fastened—usually by cement—to the structure in which the strain is to be measured. Variations in strain are transmitted to the gauge which undergoes variations in electrical resistance in proportion to the strains produced in the gauge. By means of suitable instruments, the electrical resistance of a strain gauge may be measured at any particular time, and this measurement will give an indication of the strain present in the structure at that reading. The devices which translate the variations of electrical resistance into readings of strain are conventionally designated as amplifiers. It is at once apparent that in order to get accurate readings the amplifier itself must be properly calibrated.

In order to properly calibrate amplifying equipment which is to be used in conjunction with other strain gauges, it is desirable that strains be generated of desired frequencies and amplitudes. These desired frequencies and amplitudes are accurately computed, and the resulting corresponding readings on the amplifier equipment which is being calibrated will enable the amplifier to be accurately used with strain gauges placed on other structures or machinery under test. It is desirable that calibrating equipment be of such a nature that it may readily be adjusted to produce desired frequencies and amplitudes in resistance-type strain gauges. This invention is directed to improved calibrator equipment.

This invention discloses a strain-gauge amplifier calibrator which basically consists of a cantilever beam which is of essentially equal stress throughout when subjected to a concentrated load at the free end thereof. To produce this concentrated load, the free end of the cantilever beam is connected to an eccentric which is mounted upon a journalled shaft. This shaft is in turn drivingly connected to a suitable transmission. The transmission is in turn drivingly connected to an electric motor.

While the type of loading which is disclosed in this invention has been previously used, this invention discloses the novel combination of drive equipment and adjustments which may be made thereto. Consequently a type of calibrator is provided in which compactness and ease of adjustment have been achieved by the use of a separator motor, transmission, and the eccentric shaft which is for beam actuation.

It is, therefore, an object of this invention to provide an improved strain gauge amplifier calibrator.

It is another object of this invention to provide a strain gauge amplifier calibrator which is able to generate strains of varying frequencies and amplitudes in resistance-type strain gauges.

It is a further object of this invention to provide a strain gauge amplifier calibrator utilizing a cantilever beam which is essentially of equal stress throughout when subjected to a concentrated load at the free end.

It is still another object of this invention to provide a strain gauge amplifier calibrator particularly adapted for use in a laboratory because of its compactness and ease of adjustment.

It is a still further object of this invention to provide a strain gauge amplifier calibrator wherein variations may be readily made to initial (pre-load) stress and cyclic stress.

It is yet another object of this invention to provide a strain gauge amplifier calibrator in which the speed, or frequency, adjustments may be readily made through the use of a variable-speed transmission.

Other objects and advantages of this invention will become readily apparent upon reference to the following description when taken in conjunction with the accompanying drawings, wherein:

Figure 1 is a top plan view of the strain gauge amplifier calibrator disclosed as this invention;

Figure 2 is a partial sectional view taken through the carrier plate in the supporting base along the line 2—2 in Figure 1;

Figure 3 is a side elevational view showing the beam-actuating mechanism, and with the connecting rod shown in section; and Figure 4 is a partial sectional view taken along the line 4—4 of Figure 3, and showing the arrangement of the eccentrics upon the shaft.

Returning now to the drawings, more particularly to Figure 1, wherein like reference characters indicate the same parts throughout the various views, 10 indicates a supporting base for the strain gauge amplifier calibrator. A carrier plate 11 is movably positioned upon the supporting base 10. A slot 12 is located in one end of the carrier plate 11, and a slot 13 is similarly located in the other end of the carrier plate 11. A threaded bolt 14 is inserted through the slot 12 to threadedly engage the supporting base 10. A second threaded bolt 15 is similarly inserted through the slot 13 to threadedly engage the supporting base 10.

A clearance hole 16 is located at approximately the central point of the carrier plate 11. This clearance hole is substantially circular in configuration. A central boss 17 is welded to the supporting base 10, and so positioned that it extends upwardly through approximately the center of the clearance hole 16. Bosses 18 and 19 are welded diametrically opposite of each other on the carrier plate 11 at the edge of the clearance hole 16. As indicated in Figure 1, these bosses are in alignment with each other.

Proceeding now to Figure 2, which shows in detail the aforementioned boss structure, there is disclosed therein a threaded rod 20 which successively engages a plurality of threaded openings 21, 22, and 23, which are located respectively in the bosses 17, 18, and 19. Nuts 24 and 25 are positioned on the threaded rod 20 on either side of the central boss 17.

An electric motor 26 of suitable size is slidably mounted upon the carrier plate 11. The electric motor 26 has a base 27 which has a plurality of slots 28 therein. A plurality of bolts 29 inserted through the slots 28 threadedly engage the carrier plate 11 to secure the electric motor 26 to the carrier plate 11. A transmission 30 is secured by means of bolts 31 to the carrier plate 11. A drive belt 32 drivingly connects the transmission 30 with the electric motor 26. The transmission 30 has a handle 33 thereon which is used for varying the output speed of the transmission 30. The transmission 30 has an output shaft 34 upon which is affixed a pulley 35.

Mounted on the supporting base 10, on the end opposite from that of the carrier plate 11, is a cantilever beam assembly indicated generally as 36. The cantilever beam assembly 36 comprises a base plate 37 which is rigidly secured to the supporting base 10. Base plate 37 has an extended portion 38 which is preferably integral with the base plate 37. A vertical supporting member 39 is affixed to the supporting base 10 at the extreme end of the extended portion 38. It may be desirable under certain conditions that the extended portion 38 should serve as a spacer between the vertical supporting member 39 and base plate 37. In this event the extended portion 38 would then be made separate from the base plate 37.

The vertical supporting member 39 is so dimensioned as to be as rigid as possible. It is desired that vertical supporting member 39 present a substantially immovable foundation for reasons to be described in detail later.

The cantilever beam 40 is affixed to the top turface of the vertical supporting member 39 by means of a clamping bar 41 and suitable bolts 42. The bolts 42 threadedly engage the vertical supporting member 39. The cantilever beam 40 is so designed that it has an essentially equal stress throughout when subjected to a concentrated load at the free end thereof. Such a beam may be constructed in any of several different shapes. The cantilever beam 40 disclosed in this invention has a triangular-breadth constant-depth shape. The cantilever beam may have other shapes such as constant-breadth, parabolic-depth, or breadth and depth of similar geometric figures-cubic profile, and the like.

The cantilever beam 40 comprises lateral sides 43 and 44 and a base 45. The triangular cantilever beam is so dimensioned that the lateral sides 43 and 44 will meet, when extended, at the point where the concentrated load is to be applied. The exact manner in which the concentrated load is applied will be described in detail later.

Mounted on the upper face of the cantilever beam 40 is a plurality of resistance-type strain gauges 46.

Suitably secured to the base plate 37 is a pair of mounting brackets 47 and 48. Journaled within the mounting brackets 47 and 48 is an eccentric shaft 49. An eccentric sleeve 50 is rigidly secured to the eccentric shaft 49 and has a threaded portion 51 at one end thereof. A flange 52 is constructed integrally on the other end of the eccentric sleeve 50. A second eccentric sleeve 53 has an integral flange 54 on one end thereof. This second eccentric sleeve 53 is mounted upon the first eccentric sleeve 50 so that the flange 54 is opposite from the flange 52 on the first eccentric sleeve 50. A bearing locking nut 55 is mounted adjacent the threaded portion 51 and in contact with the flange 54 on eccentric sleeve 53. The bearing locking nut 55 is loosely mounted so that it is capable of limited movement on the eccentric sleeve 50. A pair of locking nuts 56 and 57 are used to lock the bearing nut 55 against the flange 54 into the desired position. Scribed lines may be provided for the flange 54 and the bearing locking nut 55 with "high" and "low" positions marked thereon.

When the amount of throw which is desired from the eccentric sleeves 53 and 50 has been determined, the eccentric sleeve 53 is positioned upon the eccentric sleeve 50. This adjustment is made by turning the outer eccentric sleeve 53. A spanner wrench is used on the bearing locking nut 55 (which is loosely fixed on to the outer eccentric sleeve 53) to obtain the desired adjustment. Said adjustment is then maintained by means of the lock nuts 56 and 57. Consequently the eccentric sleeve 53 is clamped between the flange 52 and the lock nuts 56 and 57. A collar 58 is placed upon the end of eccentric sleeve 53 opposite from that having the flange 54. A lower ball bearing 59 is mounted upon the eccentric sleeve 53 between the collar 58 and the flange 54.

Returning to the cantilever beam 40, a short shaft section 60 is secured to the free end of the cantilever beam 40. One way in which the shaft section 60 may be secured is to provide the cantilever beam 40 with a pair of extension arms 61 and 62 which project from the lateral sides 43 and 44 respectively. The shaft section 60 may then be secured between the extension arms 61 and 62 by means of rivets 63. The exposed portion of the shaft section 60 is just large enough to accommodate an upper ball bearing 64. The upper ball bearing 64 is so positioned upon shaft section 60 that the center of the upper ball bearing 64 is juxtapositioned with the meeting point of the lateral sides 43 and 44 extended as previously described.

By so positioning the upper ball bearing 64 a concentrated load will be applied at the exact point of the free end of the cantilever beam 40. The lower ball bearing 59 and the upper ball bearing 64 are connected by means of a connecting rod indicated generally as 65. The connecting rod 65 comprises a lower ball bearing receiving portion 66 and an upper ball bearing receiving portion 67. The lower ball bearing receiving portion 66 has a tubular projecting portion 68 which has internal threads 69.

The upper ball bearing receiving portion 67 has a tubular projecting portion 70 which has internal threads 71. The shaft 72, which is threaded on each end, has these threaded ends inserted into tubular portions 68 and 70 respectively. A knurled thimble 73 is secured to approximately the center section of the shaft 72. A jam nut 74 is threaded upon one end of the shaft 72 and is adapted to engage the end of the tubular projecting portion 68.

By virtue of this construction it may be seen that this connecting rod 65 is actually a turn buckle. The thimble 73 may be scribed with calibration lines which may be aligned selectively with scribed lines on the upper tubular projecting portion 70 for any given initial stress. The length of the connecting rod 65 is varied by turning the thimble 73 and then locking the jam nut 74 against the tubular projecting portion 68 to maintain any given adjustment.

On one end of the shaft 49 there is mounted a flywheel 75. Preferably upon the same end of the shaft there is also mounted a pulley 76. A belt 77 is used to connect the pulley 76 with the pulley 35 which is located upon the transmission 30.

It will be appreciated that with the above-described structure many rapid adjustments are possible. The belt 32 may be adjusted by moving the electric motor 26 in relation to the transmission 30. The motor 26 is clamped in position by tightening the bolts 29.

The belt 77 may be adjusted by suitably positioning the carrier plate 11 upon the supporting base 10. This adjustment is carried out by locking the nuts 24 and 25 at the proper position upon the threaded rod 20.

Frequency or speed adjustment may be quickly carried out by adjusting the handle 33 which is mounted upon the transmission 30. The connecting rod 65 may be adjusted to place an initial or pre-load stress upon the cantilever beam 40. The turn-buckle construction of the connecting rod 65 makes this adjustment easy to accomplish.

The variation in cyclic stress is effected at the shaft 49. The desired cyclic stress may be obtained by suitably adjusting the eccentric sleeves 50 and 53 in the manner previously described.

Once the desired adjustments have been made in the apparatus, calibration of amplifiers may be begun. In order that the effects of friction may be reduced to an absolute minimum, the upper and lower ball bearings, 64 and 59 respectively, are fully sealed and contain an ample supply of lubricant.

When the apparatus is being operated at the desired rate, fly-wheel 75 acts as a speed regulator. Consequently the loading cycle of the cantilever beam 40 at any speed is stable and symmetrical. If desired, a tachometer drive may be added to read the output speed either as revolutions-per-minute or cycles-per-second.

Therefore it may be seen that the above-disclosed apparatus is especially suited for laboratory work because of its many adjustments which may be rapidly made. Consequently, amplifier devices can be more quickly and accurately calibrated. This, in turn, will result in more extensive and accurate use of resistance-type strain gauges.

It will be understood that this invention is susceptible to modification in order to adapt it to different usages and conditions, and accordingly it is desired to comprehend such modifications within this invention as may fall within the scope of the appended claims.

What is claimed as this invention is:

1. An apparatus for generating a wide range of predetermined strains in strain gauges and comprising a supporting base, a carrier plate adjustably mounted on said base adjacent one end thereof, means for adjusting said carrier plate upon said base, a motor adjustably mounted on said carrier plate, a variable speed transmission mounted on said carrier plate and drivingly connected to said motor, a vertical supporting member extending upwardly from said base adjacent the end thereof opposite from said carrier plate, a cantilever beam detachably mounted on the top of said supporting member, said beam being shaped so as to be stressed uniformly along its entire length upon application of a concentrated load to the free end thereof, a plurality of resistance-type strain gauges mounted on both faces of said cantilever beam, a shaft journaled at each end and mounted upon said supporting base beneath the free end of said cantilever beam, means drivingly connecting said shaft with said variable speed transmission, a flywheel mounted on said shaft, adjustable eccentric means mounted on said shaft, and an adjustable connecting rod connecting said eccentric means and the free end of said cantilever beam for cyclically imparting a concentrated load to the free end of said cantilever beam.

2. An apparatus for generating a wide range of predetermined strains in strain gauges and comprising a supporting base, a carrier plate adjustably mounted on said base adjacent one end thereof, means for adjusting said carrier plate upon said base, a motor adjustably mounted on said carrier plate, a variable speed transmission mounted on said carrier plate and drivingly connected to said motor, a vertical supporting member extending upwardly from said base adjacent the end thereof opposite from said carrier plate, a cantilever beam detachably mounted on the top of said supporting member, said beam being shaped so as to be stressed uniformly along its entire length upon application of a concentrated load to the free end thereof, a plurality of resistance-type strain gauges mounted on both faces of said cantilever beam, a shaft journaled at each end and mounted upon said supporting base beneath the free end of said cantilever beam, said shaft being drivingly connected with said variable speed transmission, and means connecting said shaft and the free end of said cantilever beam for imparting cyclical stresses of varying amplitudes to said free end.

3. An apparatus for generating a wide range of predetermined strains in strain gauges and comprising a supporting base, a vertical supporting member extending upwardly from said base adjacent the one end thereof, a cantilever beam detachably mounted on the top of said supporting member, said cantilever beam being shaped so as to be stressed uniformly along its entire length upon application of a load to the free end thereof, a plurality of resistance-type strain gauges mounted on both faces of said cantilever beam, a shaft journaled at each end and mounted upon said base beneath the free end of said cantilever beam, a flywheel mounted on said shaft, adjustable eccentric means mounted on said shaft, an adjustable connecting rod connecting said eccentric means on the free end of said cantilever beam for cyclically imparting a concentrated load to the free end of said cantilever beam, means for varying said concentrated load with a predetermined periodicity, said eccentric means and said adjustable rod being adapted to vary the amplitude of the deflection of said cantilever beam from the concentrated load applied to the free end thereof.

References Cited in the file of this patent
UNITED STATES PATENTS

| | | |
|---|---|---|
| 1,756,515 | Hulsey | Apr. 29, 1930 |
| 2,252,464 | Kearns | Aug. 12, 1941 |
| 2,316,975 | Ruge | Apr. 20, 1943 |
| 2,453,023 | L'Hermite | Nov. 2, 1948 |
| 2,487,681 | Weisselberg | Nov. 8, 1949 |
| 2,499,033 | Oberholtzer | Feb. 28, 1950 |
| 2,592,237 | Bradley | Apr. 8, 1952 |
| 2,715,331 | Yates et al. | Aug. 16, 1955 |